(12) United States Patent
Anzai et al.

(10) Patent No.: US 6,278,669 B1
(45) Date of Patent: Aug. 21, 2001

(54) OBJECTIVE LENS DRIVING APPARATUS

(75) Inventors: Joji Anzai, Suita; Akihiro Yasuda, Neyagawa, both of (JP)

(73) Assignee: Matsushita Electric Industrial Company, Ltd., Osaka (JP)

( * ) Notice: Subject to any disclaimer, the term of this patent is extended or adjusted under 35 U.S.C. 154(b) by 0 days.

(21) Appl. No.: 09/260,352

(22) Filed: Mar. 2, 1999

(30) Foreign Application Priority Data

Mar. 4, 1998 (JP) .................................................. 10-051721

(51) Int. Cl.[7] ....................................................... G11B 7/00
(52) U.S. Cl. ....................................... 369/44.14; 369/44.15
(58) Field of Search ............................. 369/44.14, 44.16, 369/44.15, 44.25, 44.32; 359/813, 814, 823, 824

(56) References Cited

U.S. PATENT DOCUMENTS 5,285,434 * 2/1994 Kim et al. ........................ 369/44.14
5,321,678 * 6/1994 Takishima et al. ............... 369/44.14
5,323,369 * 6/1994 Kim .............................. 369/44.14 X

* cited by examiner

*Primary Examiner*—Muhammad Edun
(74) *Attorney, Agent, or Firm*—Michael K. Kelly; Snell & Wilmer, L.L.P.

(57) ABSTRACT

An objective lens driving apparatus includes an objective lens opposed to an optical disk, the objective lens having an optical axis in a vertical direction which is perpendicular to the optical disk, a holder for holding the objective lens; a supporting member for supporting the holder to be movable in at least the vertical direction and a radial direction of the optical disk; a focusing coil provided on the holder and wound around the vertical direction; and a magnetic field generation section for generating a magnetic flux crossing the focusing coil in a direction perpendicular to the vertical direction, the magnetic flux being generated to be substantially linear.

9 Claims, 12 Drawing Sheets

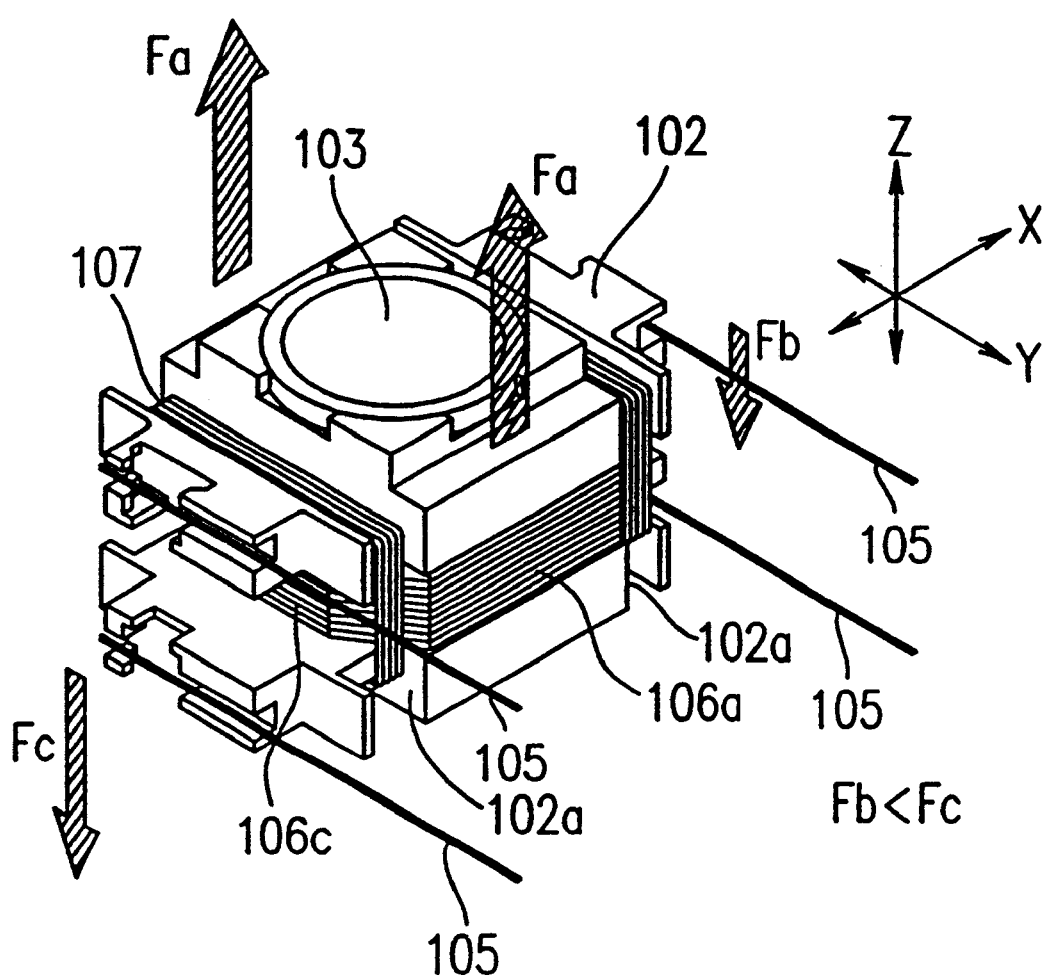

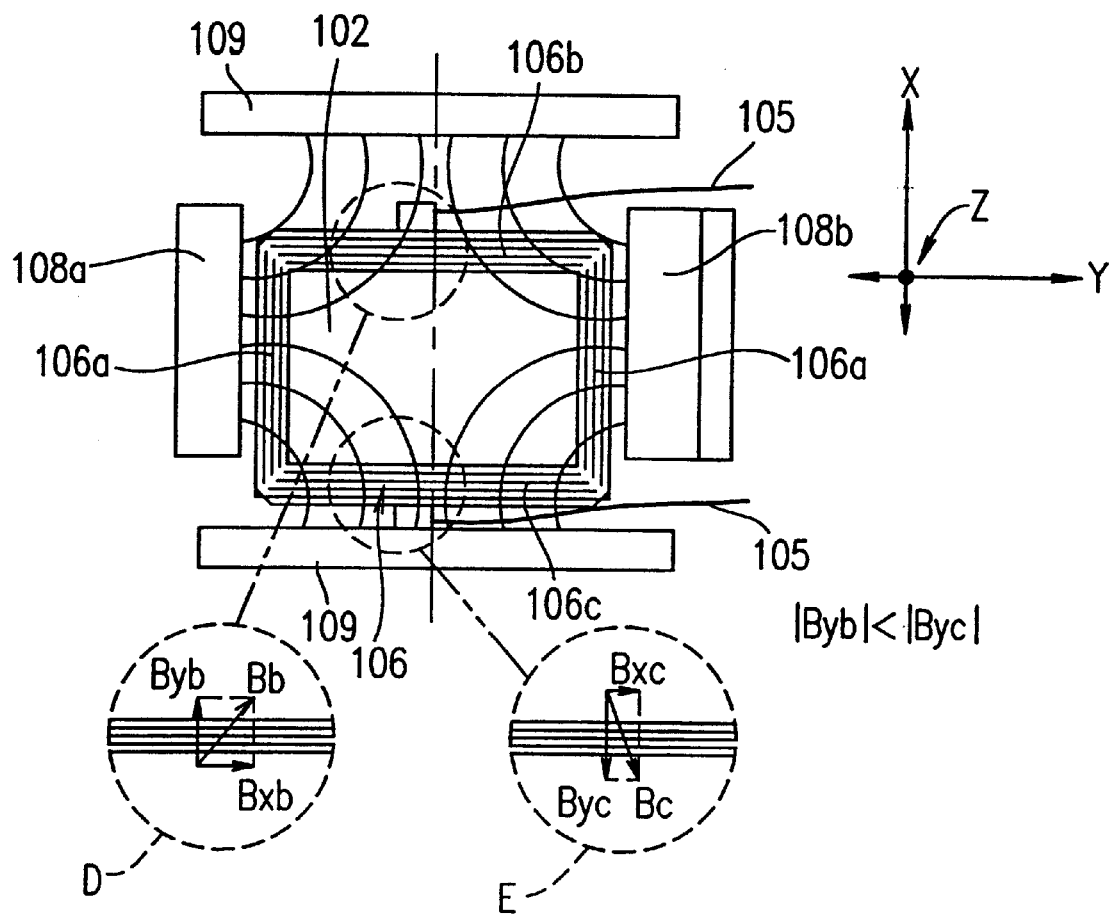

OBJECTIVE LENS DRIVING APPARATUS

BACKGROUND OF THE INVENTION

1. Field of the Invention

The present invention relates to an objective lens driving apparatus for use in, for example, an optical disk recording and reproduction apparatus for converging light emitted from a light source such as a semiconductor laser or the like to an optical disk, and recording and reproducing information.

2. Description of the Related Art

In general, optical disk recording and reproduction apparatuses such as, for example, laser disk players and compact disk players record signals to and reproduce signals from a recording layer of an optical disk by emitting a light beam such as a laser light beam or the like from an optical head toward the optical disk and receiving the reflected light or transmitted light from the optical disk with the optical head.

An optical head includes an objective lens for inputting and outputting light. The objective lens is disposed to be opposed to the optical disk. A track of the optical disk is traced by moving the objective lens in a radial direction of the optical disk by an actuator.

The objective lens is also moved up and down by an objective lens driving apparatus in accordance with the upward and downward movements of the recording layer of the optical disk caused by a warp of the optical disk. In this manner, the focusing position of the objective lens is adjusted, the tracking shift caused by the decentration of the optical disk is corrected, and a tilt angle of the objective lens with respect to the optical disk is adjusted.

When an optical axis of a light beam emitted from an optical head is tilted with respect to the recording layer of the optical disk, an optical aberration is generated, which may undesirably lower the level of a reproduction signal or cause offset or crosstalk in a focusing servo driving signal for controlling the focus of the optical head or a tracking servo driving signal for controlling the tracking. Specifically in the case of a recording and reproduction apparatus for a high density optical disk such as a digital video disk, which has been recently developed, it is demanded that the angle of the optical axis of the light beam be maintained at the maximum possible precision since even a slight tilt in the optical axis is problematic. Accordingly, an objective lens driving apparatus is also required to control the tilt of the objective lens with high precision.

FIG. 9 is an isometric view of a conventional objective lens driving apparatus 100, and FIG. 10 is an isometric view of a lens holder 102 of the objective lens driving apparatus 100 shown in FIG. 9.

In FIGS. 9 and 10, a focusing direction Z (vertical direction) matches a direction perpendicular to a recording layer of an optical disk (not shown), a tracking direction X matches a radial direction of the optical disk, and a tangent direction Y is a tangent direction of the optical disk and perpendicular to the focusing direction Z and the tracking direction X.

As shown in FIG. 9, the objective lens driving apparatus 100 includes the lens holder 102. As shown in FIGS. 9 and 10, an objective lens 103 is mounted on a center part of a top surface of the lens holder 102. A focusing coil 106 is wound around the lens holder 102, i.e., around the focusing direction Z. In FIG. 10 and the figures described below, parts of the coil 106 on four side surfaces of the lens holder 102 are indicated by reference numerals 106a, 106b, 106a and 106c (see FIG. 11A for the part 106c). A pair of tracking coils 107 are provided in two opposed side surfaces 102a of the lens holder 102 and wound around the tracking direction X. The objective lens 103 is positioned between the pair of tracking coils 107.

As best shown in FIG. 10, four elastic supporting members 105 are connected to the lens holder 102 at one end thereof. Referring to FIG. 9, the four elastic supporting members 105 each pass through respective holes (not shown) in a supporting holder 104 and are connected to a printed circuit board 111 at the other end thereof.

The supporting holder 104 is secured to a securing base 101, and the printed circuit board 111 is secured to the supporting holder 104. Thus, the securing base 101, the supporting holder 104, and the printed circuit board 111 are integrated together. As best shown in FIG. 10, the four elastic supporting members 105 cantilever the lens holder 102 to the securing base 101 to be movable in the focusing direction Z and the tracking direction X.

Returning to FIG. 9, a pair of magnets 108a and 108b have a magnetization direction in the tangent direction Y. The magnets 108a and 108b are provided on the securing base 101 so that the same magnetic pole surfaces thereof face each other. The lens holder 102 is positioned between the magnets 108a and 108b. A pair of magnetic shielding plates 109 each formed of a magnetic material are provided on the securing base 101 so as to interpose the lens holder 102. The magnetic shielding plates 109 are each arranged perpendicular to the tracking direction X.

With reference to FIGS. 11A, 11B and 1C, an operation of the conventional objective lens driving apparatus 100 shown in FIGS. 9 and 10 will be described. FIGS. 11A, 11B and 11C are schematic plan views of the lens holder 102 shown in FIG. 9 and the vicinity thereof.

Referring to FIG. 11A, when an electric current flows in the focusing coil 106 located in the magnetic fields of the magnets 108a and 108b, a force acts on the focusing coil 106 in the focusing direction Z, thereby moving the lens holder 102 in the focusing direction Z. At this point, as shown in FIG. 10, the direction of a force Fa acting on the two opposed parts 106a of the focusing coil 106 and the direction of forces Fb and Fc acting on the other two parts 106b and 106c of the focusing coil 106 are opposite from each other. However, since the parts 106a are closer to the magnets 108a and 108b than the parts 106b and 106c, the number of magnetic fluxes crossing each of the parts 106a is larger than the number of magnetic fluxes crossing each of the parts 106b and 106c. Accordingly, the force Fa is stronger than the force Fb or Fc. As a result, the lens holder 102 moves in the direction of the force Fa.

Referring to FIG. 11B, two opposed parts of each tracking coil 107 are indicated by reference numeral 107a, and the other two opposed parts of each tracking coil 107 are indicated by reference numeral 107b. When an electric current flows in the tracking coils 107 located in the magnetic fields of the magnets 108a and 108b, a force acts on the tracking coil 107 in the tracking direction X, thereby moving the lens holder 102 in the tracking direction X. At this point, the direction of a force acting on the two opposed parts 107a of the tracking coil 107 and the direction of a force acting on the other two parts 107b of the tracking coil 107 are opposite from each other. However, since the parts 107a are closer to the magnets 108a and 108b than the parts 107b, the force acting on the parts 107a is stronger than the force acting on the parts 107b. As a result, the lens holder 102 moves in the direction of the force acting on the parts 107a.

In the state where the lens holder 102 has not been moved in the tracking direction X as shown in FIG. 11A, the force Fb and the force Fc respectively acting on the parts 106b and 106c of the focusing coil 106 have an equal magnitude. Thus, even when the lens holder 102 is moved in the focusing direction Z, the lens holder 102 does not tilt.

However, in the state where the lens holder 102 has been moved in the tracking direction X as shown in FIG. 11C, the angle of magnetic flux Bb crossing the part 106b of the focusing coil 106 (enlarged part D) and the angle of magnetic flux Bc crossing the part 106c of the focusing coil 106 (enlarged part E) are different from each other. Accordingly, the magnitude of vector component Byb, of the magnetic flux Bb, perpendicular to the part 106b, and the magnitude of vector component Byc, of the magnetic flux Bc, perpendicular to the part 106c, are different from each other. That is, |Byb|<|Byc|. Accordingly, when an electric current flows in the focusing coil 106 in this state, the magnitude of the force Fb is different from the magnitude of the force Fc; that is Fb<Fc. The magnitude difference between the forces Fb and Fc, i.e., Fc–Fb causes the lens holder 102 to rotate around the tangent direction Y. As a result, the objective lens 103 tilts.

The longer the moving distance of the focusing coil 106 in the tracking direction X is, the larger the angular difference between the magnetic flux Bb crossing the part 106b and the magnetic flux Bc crossing the part 106c is.

Such a tilt of the objective lens 103 is caused by the difference between the angle of the magnetic flux Bb with respect to the part 106b and the angle of the magnetic flux Bc with respect to the part 106c. The difference between the angles is caused because the magnetic fluxes Bb and Bc are significantly curved in an area extending from the magnets 108a and 108b to the magnetic shielding plate 109.

In order to avoid such a tilt of the objective lens, various proposals have been made. For example, according to the technology disclosed by Japanese Laid-Open Publication No. 7-240031, a top end of a counter yoke is arranged to be at a higher level than a top end of a magnet, so that a moment in proportion to the moving distance of the lens holder in the focusing and tracking directions is generated in the lens holder, and thus a moment of the lens holder caused by the shift between the center of gravity and the supporting center/driving center is always counteracted, regardless of the moving direction and distance of the lens holder. In this manner, the tilt of the objective lens is avoided, and the optical aberration and focal shift are restricted, so as to realize correct recording and reproduction of information.

As described above, in the case of the objective lens driving apparatus 100 shown in FIG. 9, when the lens holder 102 is moved in the focusing direction Z in the state where the lens holder 102 has been moved in the tracking direction X, the force Fb acting on the part 106b of the focusing coil 106 and the force Fc acting on the part 106c of the focusing coil 106 have different magnitudes, thereby tilting the lens holder 102. The longer the moving distance of the focusing coil 106 in the tracking direction X is, the more significantly the objective lens 103 tilts.

As a result, an optical aberration is generated at a spot on the recording layer of the optical disk where the light is converged; a focal shift is generated with respect to the recording layer to inhibit accurate recording of the signals to the recording layer; or signals reproduced from the recording layer is deteriorated.

According to the technology disclosed by Japanese Laid-Open Publication No. 7-240031, the counter yoke is inserted throughout the lens holder. Such a structure increases the size and weight of the lens holder. When the weight of the lens holder is increased; the sensitivity to the acceleration of the lens holder which is required to comply with the fluctuation of the recording layer or decentration of the optical disk; or an excessive load is applied to the contact face between the coil and the lens holder, resulting in deterioration of the transfer efficiency of the force from the coil to the lens holder. Such deterioration of the transfer efficiency lowers the frequency response characteristics of the objective lens.

The technology disclosed by the above-described document has another problem in that since the counter yoke and a rear yoke are connected to each other at bottom portions thereof and still the top ends of the counter yoke and the rear yoke are maintained at a higher level than the magnets. Therefore, the lens holder is enlarged in the focusing direction and is unlikely to be smaller and thinner in the focusing direction.

SUMMARY OF THE INVENTION

An objective lens driving apparatus according to the present invention includes an objective lens opposed to an optical disk, the objective lens having an optical axis in a vertical direction which is perpendicular to the optical disk; a holder for holding the objective lens; a supporting member for supporting the holder to be movable in at least the vertical direction and a radial direction of the optical disk; a focusing coil provided on the holder and wound around the vertical direction; and a magnetic field generation section for generating a magnetic flux crossing the focusing coil in a direction perpendicular to the vertical direction, the magnetic flux being generated to be substantially linear.

In one embodiment of the invention, the magnetic field generation section includes a pair of magnets arranged in a tangent direction of the optical disk and opposed to each other, the focusing coil is disposed between the magnets, and the magnets have magnetic fields of different magnitudes so as to generate the substantially linear magnetic flux crossing the focusing coil.

In one embodiment of the invention, the magnets have different lengths in the radial direction of the optical disk so as to have magnetic fields of different magnitudes.

In one embodiment of the invention, the objective lens driving apparatus further includes a magnetic material having a first wall for covering an outer side surface of one of the magnets, and a second wall and a third wall for electromagnetically shielding a space between the magnets.

In one embodiment of the invention, the magnetic material positions one of the magnets and electromagnetically shields the space between the magnets.

In one embodiment of the invention, the focusing coil has an asymmetric shape with respect to an axis in the radial direction of the optical disk, the axis in the radial direction running through a substantially central point of the focusing coil.

In one embodiment of the invention, the objective lens driving apparatus further includes a tracking coil provided on the holder and wound around the radial direction of the optical disk. The tracking coil has an asymmetric shape with respect to an axis in the vertical direction of the optical disk, the axis in the vertical direction running through a substantially central point of the tracking coil.

In one embodiment of the invention, the magnets have different thicknesses in the tangent direction of the optical disk so as to have magnetic fields of different magnitudes.

In one embodiment of the invention, the magnets are formed of materials having different magnetic characteristics.

According to the present invention, a magnetic generation section generates magnetic fluxes crossing the focusing perpendicular to the vertical direction. The magnetic fluxes are substantially linear. Therefore, even when the focusing coil has been moved in the tracking direction (perpendicular to the vertical direction), the angle of the magnetic fluxes with respect to the focusing coil does not change. In the state where an electric current flows in the focusing coil, the magnitude of the force acting on the focusing coil does not change, regardless of the position of the focusing coil in the tracking direction. Thus, the tilt of the objective lens caused by the movement thereof in the tracking direction is avoided. Moreover, the size of the holder is reduced, and the frequency response characteristics of the objective lens are enhanced. The magnitude of an unnecessary force generated by the focusing coil is reduced by causing the linear magnetic fluxes to cross the focusing coil obliquely.

Thus, the invention described herein makes possible the advantages of providing an objective lens driving apparatus for preventing an objective lens from tilting while moving the objective lens in a focusing direction and enhancing the frequency response characteristics of the objective lens.

These and other advantages of the present invention will become apparent to those skilled in the art upon reading and understanding the following detailed description with reference to the accompanying figures.

BRIEF DESCRIPTION OF THE DRAWINGS

FIG. 10 is an isometric view of a lens holder in the conventional objective lens driving apparatus shown in FIG. 9;

FIG. 11C is a schematic plan view of the focusing coil shown in FIG. 11A when moved in the tracking direction.

DESCRIPTION OF THE PREFERRED EMBODIMENTS

Hereinafter, the present invention will be described by way of illustrative examples with reference to the accompanying drawings.

Figure 1:
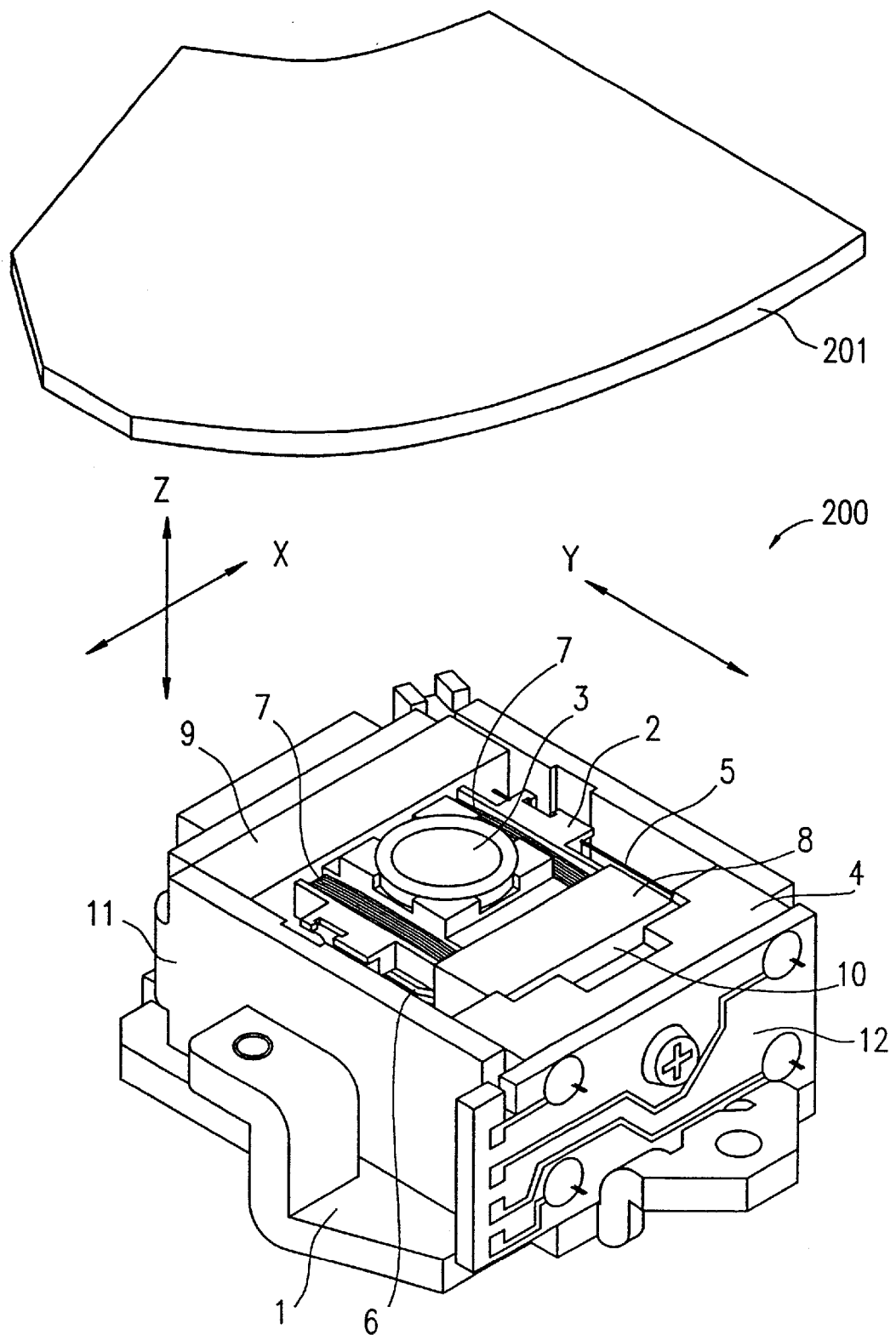
FIG. 1 is an isometric view of an objective lens driving apparatus in one example according to the present invention.
Figure 2:
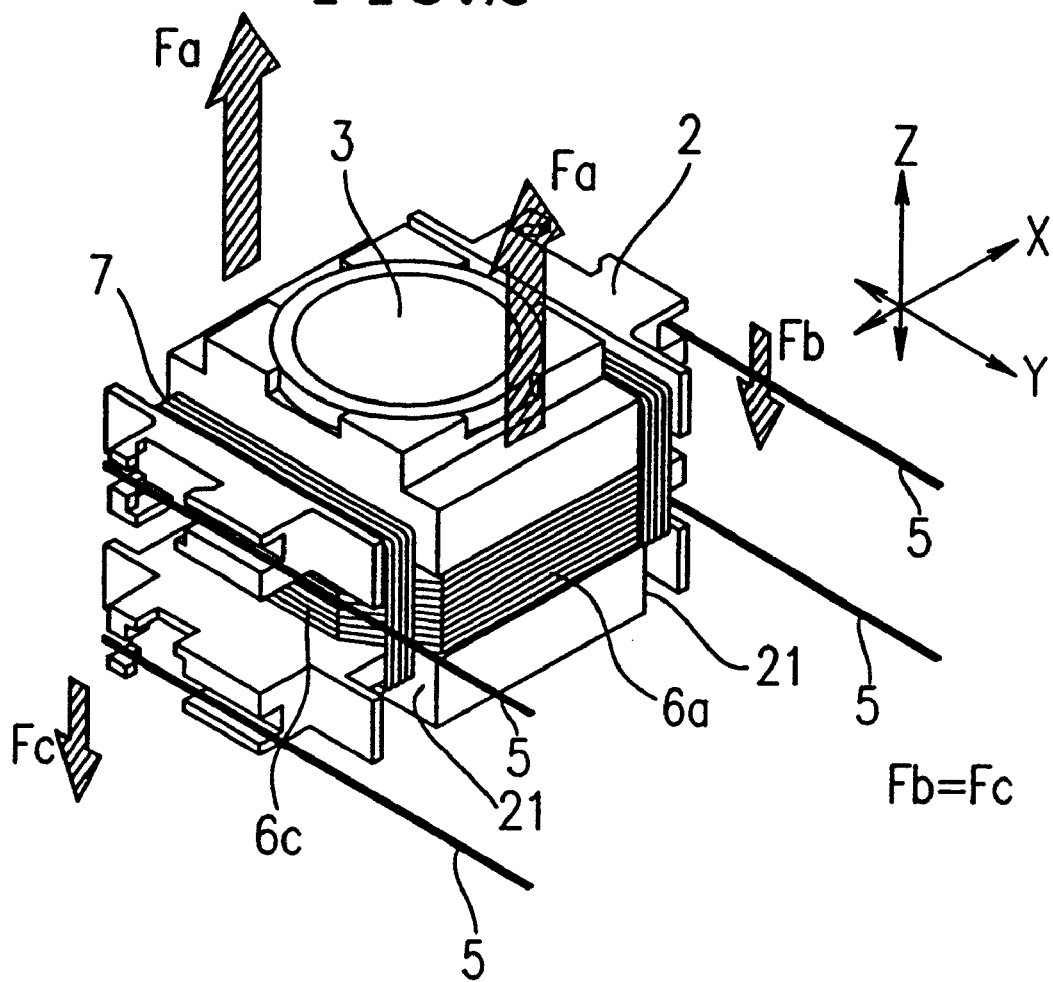
FIG. 2 is an isometric view of a lens holder in the objective lens driving apparatus shown in FIG. 1.

FIG. 1 is an isometric view of an objective lens driving apparatus 200 in one example according to the present invention. FIG. 2 is an isometric view of a lens holder 2 of the objective lens driving apparatus 200 shown in FIG. 1.

In FIGS. 1 and 2, a focusing direction Z (vertical direction) matches a direction perpendicular to a recording layer of an optical disk 201 (FIG. 1), a tracking direction X matches a radial direction of the optical disk 201, and a tangent direction Y is a tangent direction of the optical disk 201 and perpendicular to the focusing direction Z and the tracking direction X.

As shown in FIG. 1, the objective lens driving apparatus 200 includes the lens holder 2. As shown in FIGS. 1 and 2, an objective lens 3 is mounted on a center part of a top surface of the lens holder 2. A focusing coil 6 is wound around the lens holder 2, i.e., around the focusing direction Z. In FIG. 2 and the figures described below, parts of the coil 6 on four side surfaces of the lens holder 2 are indicated by reference numerals 6a, 6b, 6a and 6c (see FIG. 3A for the part 6c). A pair of tracking coils 7 are provided in two opposed side surfaces 21 of the lens holder 2 and wound around the tracking direction X. The objective lens 3 is positioned between the pair of tracking coils 7.

As best shown in FIG. 2, four elastic supporting members 5 are connected to the lens holder 2 at one end thereof. Referring to FIG. 1, the four elastic supporting members 5 each pass through respective holes (not shown) in a supporting holder 4 and are connected to a printed circuit board 12 at the other end thereof.

The supporting holder 4 is secured to a securing base 1, and the printed circuit board 12 is secured to the supporting holder 4. Thus, the securing base 1, the supporting holder 4, and the printed circuit board 12 are integrated together. As best shown in FIG. 2, the four elastic supporting members 5 cantilever the lens holder 2 to the securing base 1 to be movable in the focusing direction Z and the tracking direction X.

Returning to FIG. 1, a first magnet 8 has a magnetization direction in the tangent direction Y and is arranged so that one of magnetic pole surfaces thereof faces the lens holder 2. A first magnet holder 10 is formed of a magnetic material and supports the first magnet 8 while being in contact with the other magnetic pole surface of the first magnet 8. The first magnet holder 10 is supported by the supporting holder 4.

A second magnet 9 has a magnetization direction in the tangent direction Y and is arranged so that one of magnetic pole surfaces thereof faces the lens holder 2. A second magnet holder 11 is formed of a magnetic material and supports the second magnet 9 while being in contact with the other magnetic pole surface of the second magnet 9. The second magnet holder 11 is secured on the securing base 1.

The second magnet holder 11 is generally U-shaped when seen in the focusing direction Z, and *defines a space between the first and second magnets 8 and 9* and further covers an outer side surface of the second magnet 9. The second magnet holder 11 is provided in order to prevent the magnetic fields of the first and second magnets 8 and 9 from influencing other parts of an optical disk recording and reproduction apparatus in which the objective lens driving apparatus 200 is to be incorporated, and also in order to prevent a magnetic field generated by the motor and the like of the optical disk recording and reproduction apparatus from influencing the magnetic fields of the first and second magnets 8 and 9.

The second magnet 9 is longer than the first magnet 8 in the tracking direction X, and both ends of the second magnet 9 are in contact with the second magnet holder 11. The first and second magnets 8 and 9 are arranged so that the same magnetic pole surfaces face each other. The lens holder 2 is positioned between the magnetic pole surfaces.

Figure 3A:
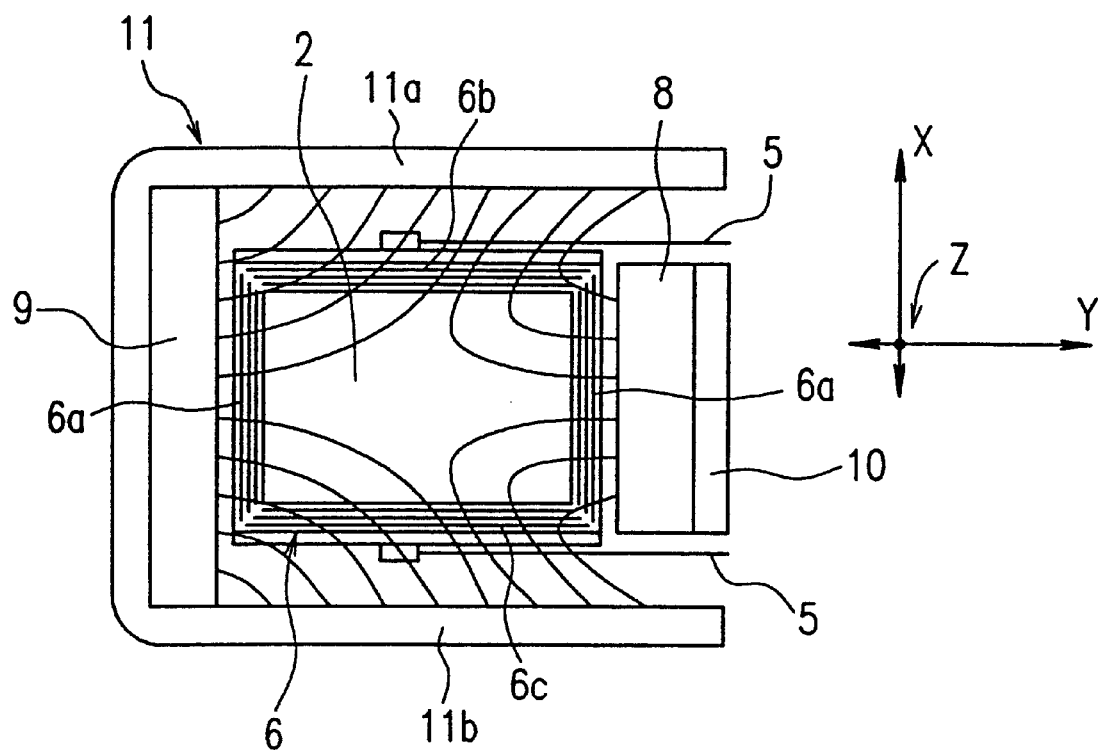
FIG. 3A is a schematic plan view of a focusing coil and the vicinity thereof in the objective lens driving apparatus shown in FIG. 1.
Figure 3B:
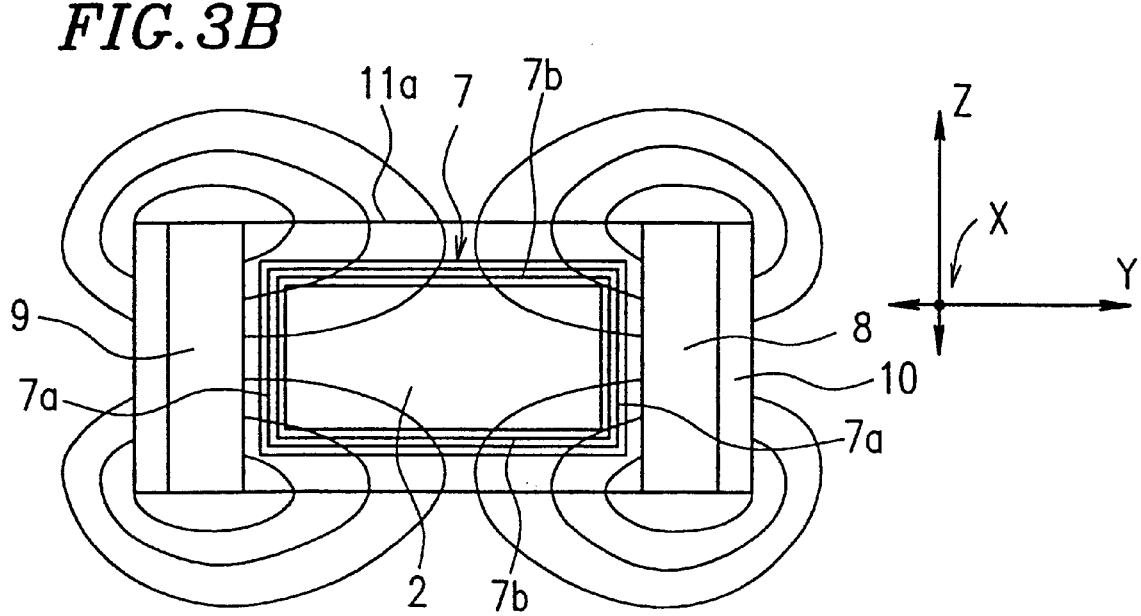
FIG. 3B is a schematic plan view of a tracking coil and the vicinity thereof in the objective lens driving apparatus shown in FIG. 1.
Figure 3C:
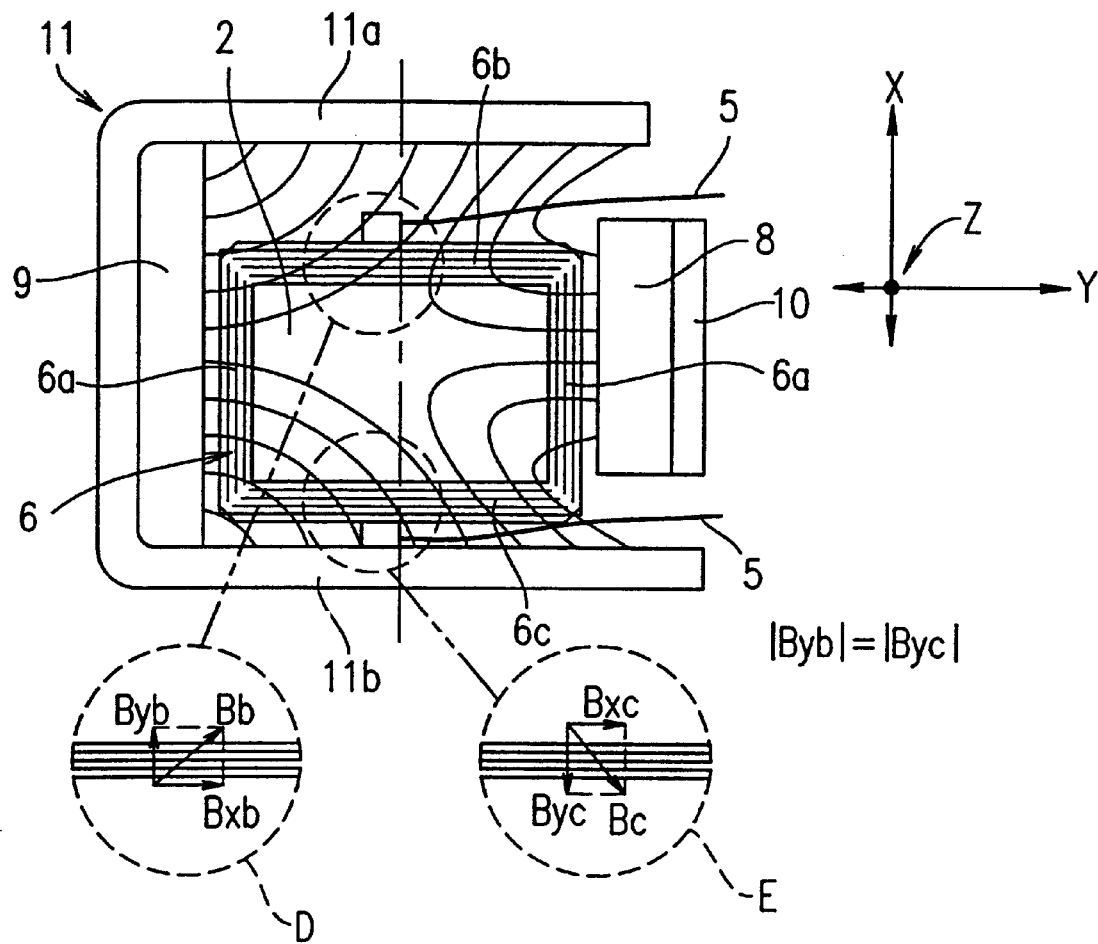
FIG. 3C is a schematic plan view of the focusing coil shown in FIG. 3A when moved in the tracking direction.

With reference to FIGS. 3A, 3B and 3C, an operation of the objective lens driving apparatus 200 shown in FIGS. 1 and 2 will be described. FIGS. 3A, 3B and 3C are schematic plan views of the lens holder 2 shown in FIG. 1 and the vicinity thereof.

As can be apparent from FIG. 3A, the second magnet 9 is longer than the first magnet 8 in the tracking direction X, and both ends of the second magnet 9 are in contact with side walls 11a and 11b of the second magnet holder 11. The second magnet 9, which is longer than the first magnet 8, has a stronger magnetic force than that of the first magnet 8. Therefore, magnetic fluxes of the second magnet 9 are generated substantially linearly from the second magnet 9 to the side walls 11a and 11b of the second magnet holder 11, and magnetic fluxes of the first magnet 8 are generated in a curve from the first magnet 8 to the side walls 11a and 11b of the second magnet holder 11. The magnetic flux density of the second magnet 9 is higher than that of the first magnet 8.

Referring to FIG. 3A, when an electric current flows in the focusing coil 6 located in the magnetic fields of the first and second magnets 8 and 9, a force acts on the focusing coil 6 in the focusing direction Z, thereby moving the lens holder 2 in the focusing direction Z. At this point, as shown in FIG. 2, the direction of a force Fa acting on the two opposed parts 6a of the focusing coil 6 and the direction of forces Fb and Fc acting on the other two parts 6b and 6c of the focusing coil 6 are opposite from each other. However, since the parts 6a are closer to the first and second magnets 8 and 9 than the parts 6b and 6c, the force Fa is stronger than the force Fb or Fc. As a result, the lens holder 2 moves in the direction of the force Fa.

Referring to FIG. 3C, as shown in enlarged parts D and E, magnetic fluxes Bb and Bc of the second magnet 9 cross the parts 6b and 6c of the focusing coil 6 obliquely. Therefore, the magnitude of vector component Byb, of the magnetic flux Bb, perpendicular to the part 6b and the magnitude of vector component Byc, of the magnetic flux Bc, perpendicular to the part 6c are reduced, and thus the forces Fb and Fc are also reduced. Consequently, the ratio of a part of the force Fa which is counteracted by the forces Fb and Fc is lowered. Thus, the lens holder 2 is efficiently moved in the direction of the force Fa.

Referring to FIG. 3B, two opposed parts of each tracking coil 7 are indicated by reference numeral 7a, and the other two opposed parts of each tracking coil 7 are indicated by reference numeral 7b. When an electric current flows in the tracking coils 7 located in the magnetic fields of the first and second magnets 8 and 9, a force acts on the tracking coil 7 in the tracking direction X, thereby moving the lens holder 2 in the tracking direction X. At this point, the direction of a force acting on the two opposed parts 7a of the tracking coil 7 and the direction of a force acting on the other two parts 7b of the tracking coil 7 are opposite from each other. However, since the parts 7a are closer to the first and second magnets 8 and 9 than the parts 7b, the force acting on the parts 7a is stronger than the force acting on the parts 7b. As a result, the lens holder 2 moves in the direction of the force acting on the parts 7a.

Then, in the state where the lens holder 2 has been moved in the tracking direction X as shown in FIG. 3C, an electric current flows in the focusing coil 6, thereby moving the lens holder 2 in the focusing direction Z.

Figure 11A:
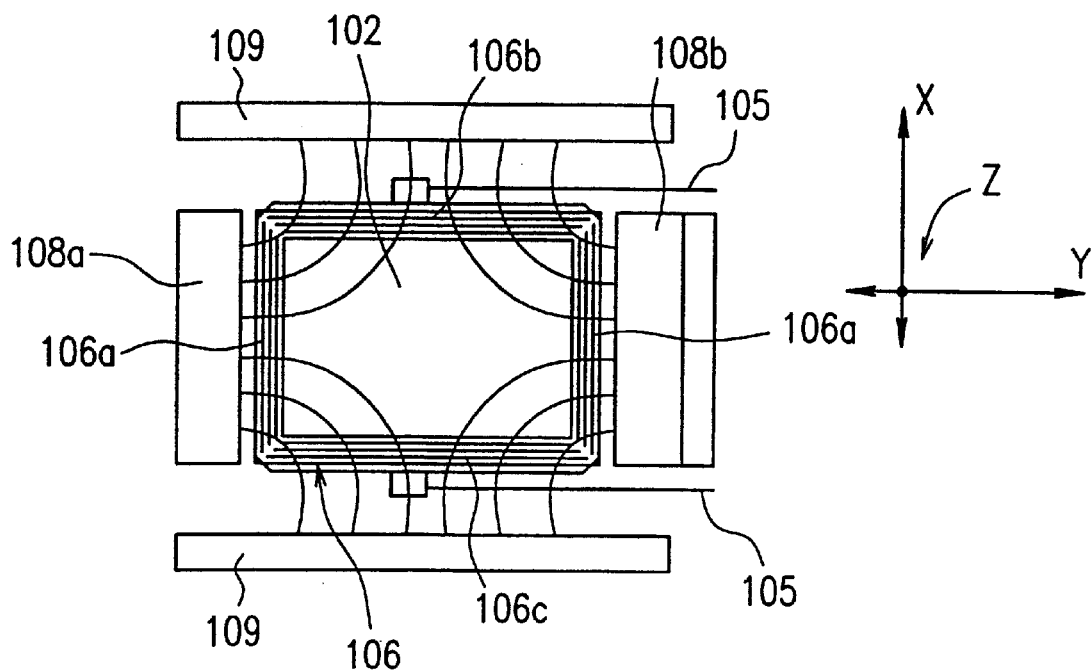
FIG. 11A is a schematic plan view of a focusing coil and the vicinity thereof in the objective lens driving apparatus shown in FIG. 9.
Figure 11B:
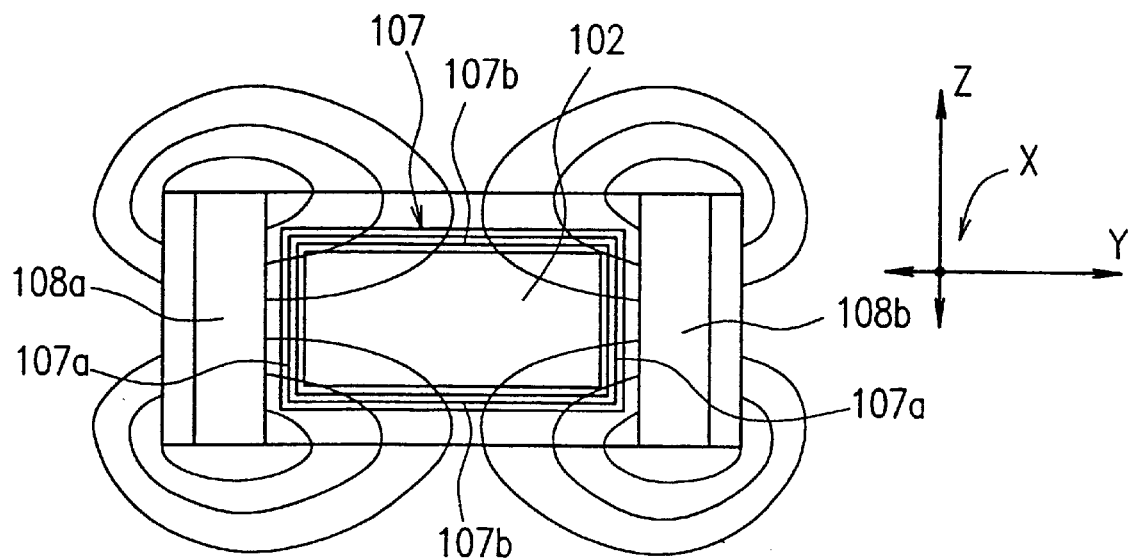
FIG. 11B is a schematic plan view of a tracking coil and the vicinity thereof in the objective lens driving apparatus shown in FIG. 9.

In the case of the conventional objective lens driving apparatus 100, as shown in enlarged parts D and E of FIG. 11C, the angle of the magnetic flux Bb crossing the part 106b of the focusing coil 106 and the angle of magnetic flux Bc crossing the part 106c of the focusing coil 106 are different from each other. Therefore, a rotational force around the tangent direction Y is applied to the focusing coil 106, which tilts the objective lens 103.

By contrast, according to the present invention, the magnetic fluxes of the second magnet 9 are generated substantially linearly from the second magnet 9 to the side walls 11a and 11b of the second magnet holder 11. Therefore, the angle of the magnetic flux Bb crossing the part 6b of the focusing coil 6 (enlarged part D of FIG. 3C) is substantially equal to the angle of the magnetic flux Bc crossing the part 6c of the focusing coil 6 (enlarged part E of FIG. 3C). As a result, the magnitude of vector component Byb, of the magnetic flux Bb, perpendicular to the part 6b substantially matches the magnitude of vector component Byc, of the magnetic flux Bc, perpendicular to the part 6c; i.e., |Byb|=|Byc|.

Accordingly, when an electric current flows in the focusing coil 6, the force Fb acting on the part 6b and the force Fc acting on the part 6c have an equal magnitude. Thus, the objective lens 3 is translated in the focusing direction Z without causing the lens holder 2 to rotate around the tangent direction Y.

As described above, the magnetic fluxes of the first magnet 8 are generated in a curve from the first magnet 8 to the side walls 11a and 11b of the second magnet holder 11. Regarding the magnetic fluxes of the first magnet 8, the angle of the magnetic flux with respect to the part 6b and the angle of the magnetic flux with respect to the part 6c are different. When an electric current flows in the focusing coil 6, the force acting on the part 6b and the force acting on the part 6c have different magnitudes due to the angle difference. However, since the magnetic flux density of the second magnet 9 is higher than that of the first magnet 8, the magnitude difference based on the magnetic fluxes of the first magnet 8 is significantly smaller than the magnitudes of the forces Fb and Fc based on the magnetic fluxes of the second magnet 9. Thus, the objective lens 3 is not tilted to such an extent that the recording and reproduction of the signals to and from the optical disk 201 (FIG. 1) are adversely effected.

As described above, according to the present invention, the magnetic force of the second magnet 9, which is longer than the first magnet 8, is stronger than that of the first magnet 8, and thus the magnetic fluxes of the second magnet 9 are generated substantially linearly and cross the parts 6b and 6c of the focusing coil 6 obliquely. As a result, the magnitudes of the forces Fb and Fc are reduced. Thus, the loss of the force Fa acting on the parts 6a of the focusing coil 6 is also reduced. Therefore, the lens holder 2 is efficiently moved in the direction of the force Fa.

Even when the lens holder 2 is moved in the tracking direction X, the angle of the magnetic flux Bb with respect to the part 6b of the focusing coil 6 is substantially equal to the angle of the magnetic flux Bc with respect to the part 6c of the focusing coil 6. Accordingly, the objective lens 3 is not tilted while moving in the focusing direction.

Furthermore, since the objective lens driving apparatus 200 can have a structure as described above, the lens holder 2 can be made more compact and more light-weight, in order to enhance the sensitivity of the lens holder 2 to the acceleration which is required to comply with the fluctuation of the recording layer or decentration of the optical disk 201. Thus, a higher operation speed and lower power consumption of the optical disk recording and reproduction apparatus are achieved. Since the magnetic circuit is quite simple, the size and production cost of the objective lens driving apparatus 200 can be reduced.

Figure 4:
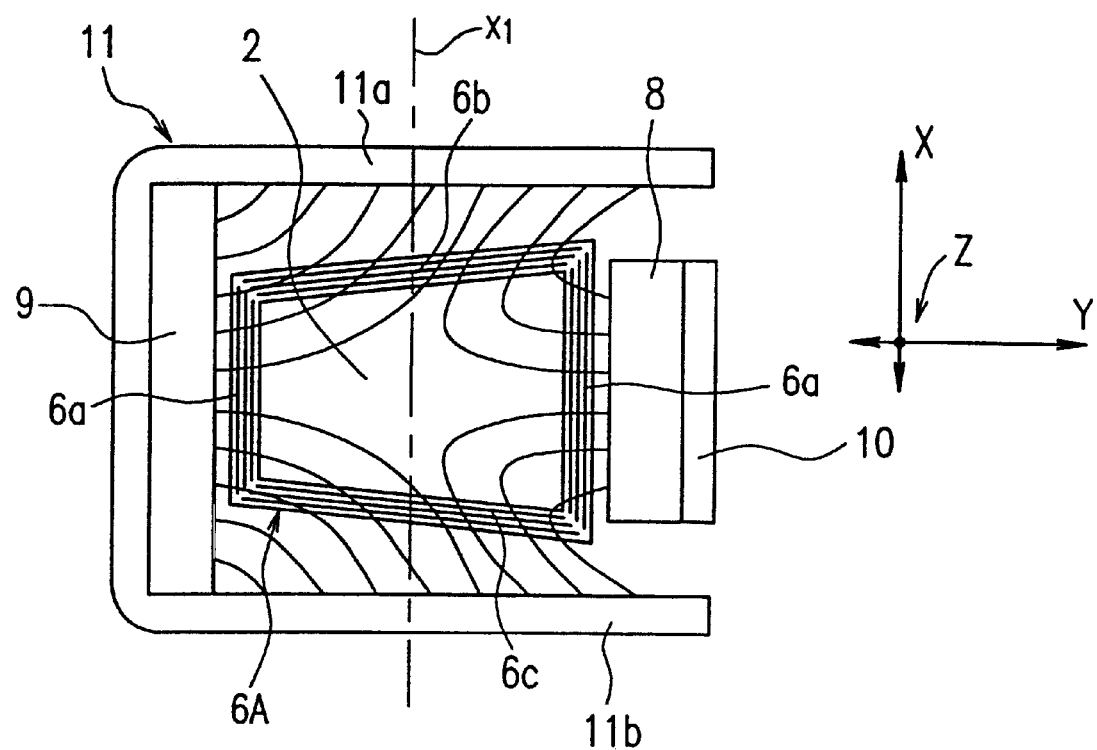
FIG. 4 is a plan view of an alternative focusing coil usable in the objective lens driving apparatus shown in FIG. 1.

FIG. 4 is a schematic plan view of an alternative focusing coil 6A. The focusing coil 6A has a trapezoidal shape in the plan view, in which the parts 6a are parallel to each other and the parts 6b and 6c are oblique with respect to the parts 6a. The focusing coil 6A is asymmetric with respect to axis x1, in the tracking direction X, which runs through a substantially central point of the focusing coil 6A and of the objective lens (not shown, see FIG. 1). Since the magnetic fluxes of the second magnet 9 cross the parts 6b and 6c obliquely, vector component Byb, of the magnetic flux Bb, perpendicular to the part 6b and vector component Byc, of the magnetic flux Bc, perpendicular to the part 6c are still smaller than in the case of the above-described example. Thus, the magnitudes of the forces Fb and Fc acting on the parts 6b and 6c are smaller than in the above-described example. When the magnitudes of the forces Fb and Fc are smaller, the difference between the forces Fb and Fc is also smaller. Accordingly, the tilt of the objective lens is further restricted. In this paragraph and the following paragraphs, letters Byb, Byc, Fb, and Fc represent the corresponding concepts to those in the above-described example although these letters are not shown in the figures.

Figure 5:
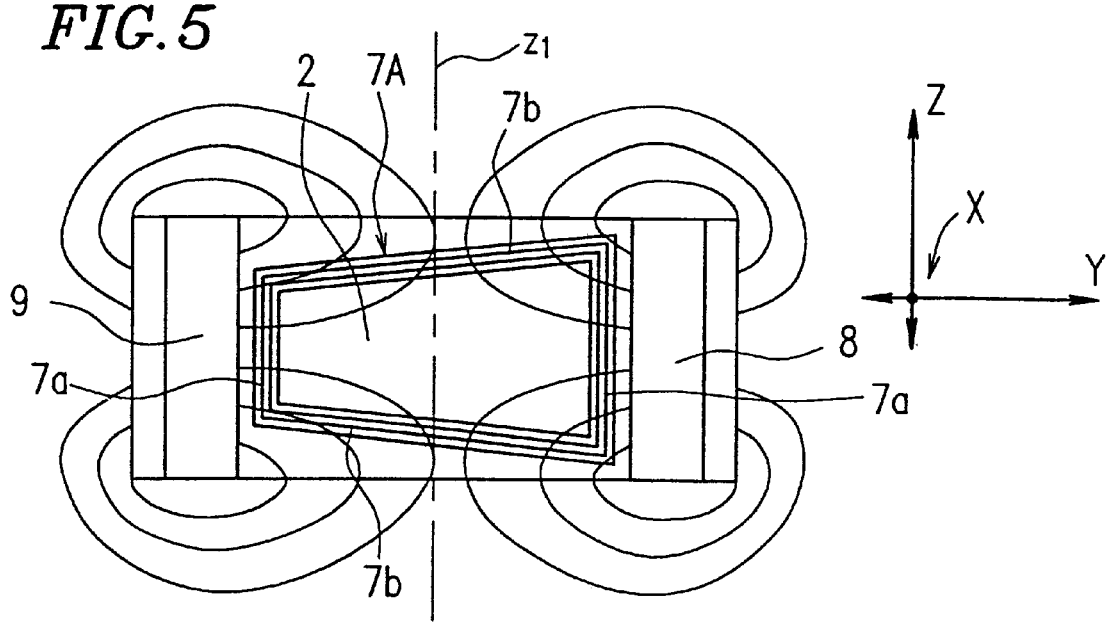
FIG. 5 is a plan view of an alternative tracking coil usable in the objective lens driving apparatus shown in FIG. 1.

FIG. 5 is a schematic plan view of an alternative tracking coil 7A. The tracking coil 7A has a trapezoidal shape in the plan view, in which the parts 7a are parallel to each other and the parts 7b are oblique with respect to the parts 7a. The tracking coil 7A is asymmetric with respect to axis z1, in the focusing direction Z, which runs through a substantially central point of the tracking coil 7A and of the objective lens (not shown; see FIG. 1). Since the magnetic fluxes of the second magnet 9 cross the parts 7b obliquely, vector components perpendicular to the parts 7b are smaller as in the case of the focusing coil 6A (FIG. 4). Therefore, the lens holder 2 is efficiently moved in the direction of the force acting on the part 7a.

Figure 6:
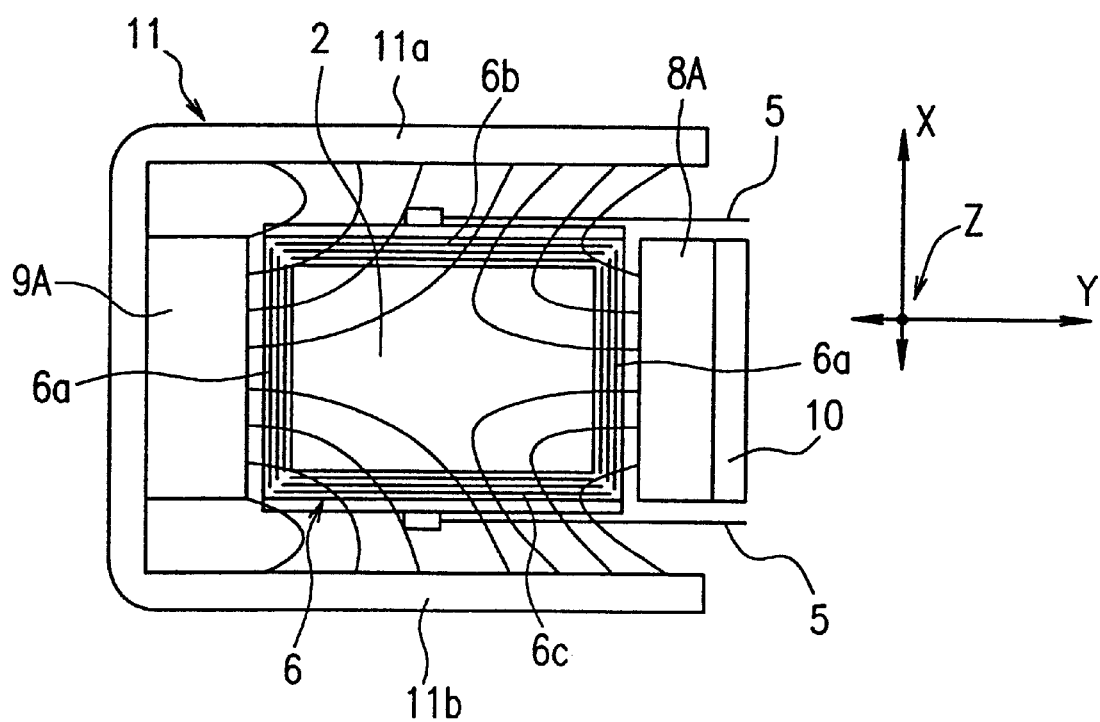
FIG. 6 is a plan view of alternative first and second magnets usable in the objective lens driving apparatus shown in FIG. 1.

FIG. 6 is a schematic plan view of alternative first and second magnets 8A and 9A. The first and second magnets 8A and 9A have an equal length but different thicknesses in the tangent direction Y. The second magnet 9A is thicker than the first magnet 8A. Due to such a thickness difference, the magnetic force of the second magnet 9A is stronger than that of the first magnet 8A. Accordingly, the magnetic fluxes of the second magnet 9A are generated substantially linearly from the second magnet 9A to the side walls 11a and 11b of the second magnet holder 11.

In another alternative example, the first and second magnets can have an equal length but are formed of materials having different magnetic characteristics. For example, the second magnet can be formed of rare earth iron having a relatively large magnet keeping force whereas the first magnet can be formed of ferrite having a smaller magnet keeping force.

In still another alternative example, the first and second magnets can have different magnetization directions in order to cause the linear magnetic fluxes of the magnets to cross the parts 6b and 6c (see FIG. 3A) of the focusing coil 6.

In the above-described example, the tracking coil 7 is provided directly on the lens holder 2 around the tracking direction X. The lens holder 2 is moved in the tracking direction X also by securing a ring-shaped coil, wound around the magnetization direction of the magnet, on an end surface of the lens holder 2 opposed to the magnet.

Figure 7:
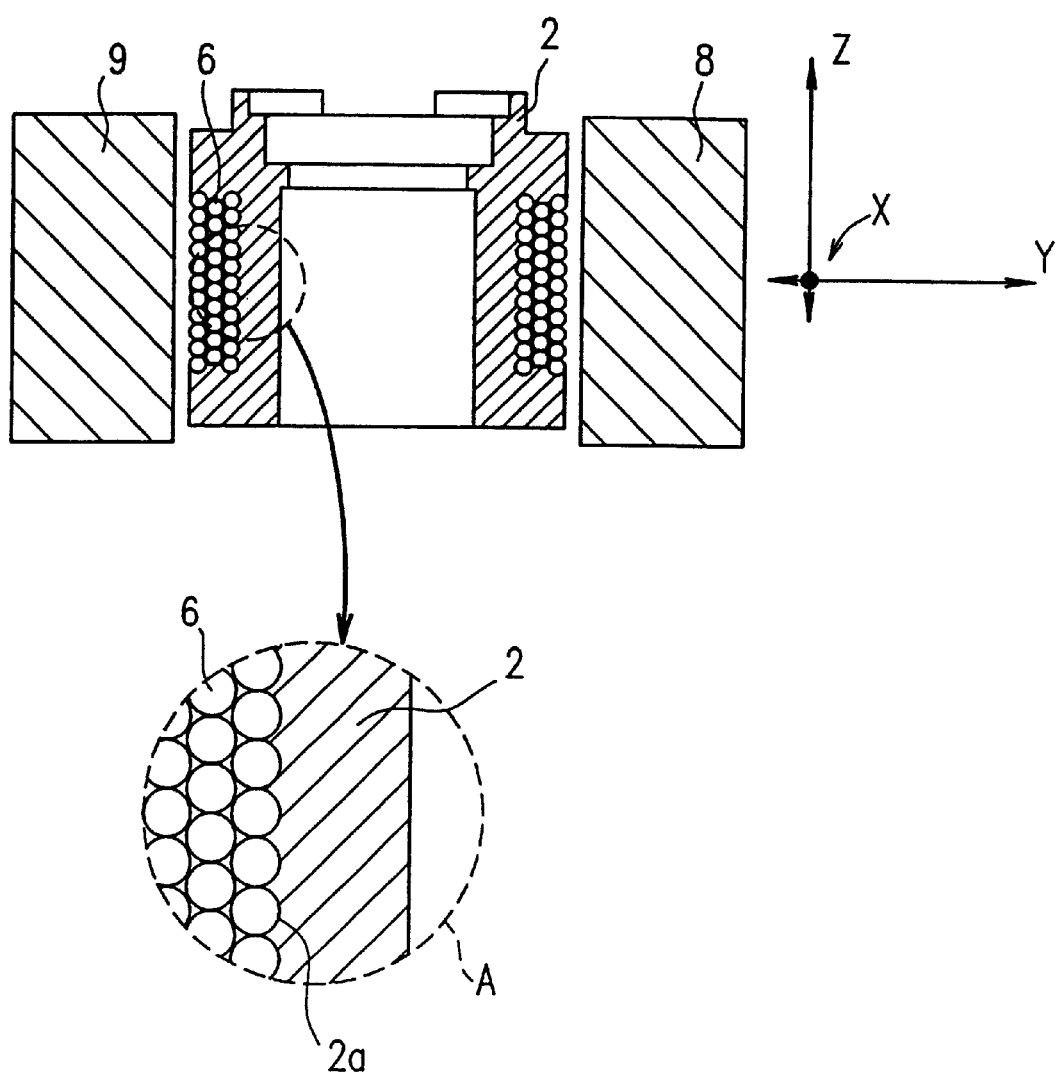
FIG. 7 is a cross-sectional view of an alternative structure of the lens holder and the focusing coil usable in the objective lens driving apparatus shown in FIG. 1.

FIG. 7 is a cross-sectional view of an alternative structure of the lens holder 2 and the focusing coil 6. As shown in enlarged part A of FIG. 7, the lens holder 2 has a plurality of grooves 2a in the side surfaces thereof to be provided with the focusing coil 6. The inner peripheral surfaces of the grooves 2a have a substantially equal curvature to that of the wires of the focusing coil 6. Since the wires of the focusing coil 6 are fit in the grooves 2a, the contact area between the focusing coil 6 and the lens holder 2 increases. Due to such a structure, the focusing coil 6 is secured on the lens holder 2 with higher certainty, and thus the force acting on the focusing coil 6 is accurately transferred to the lens holder 2. As a result, the objective lens (not shown, see FIG. 1) is accurately displaced in response to the driving current flowing in the focusing coil 6 and the phase characteristics of the displacement is stabilized. Consequently, the objective lens is less likely to be influenced by external disturbances.

Figure 8A:
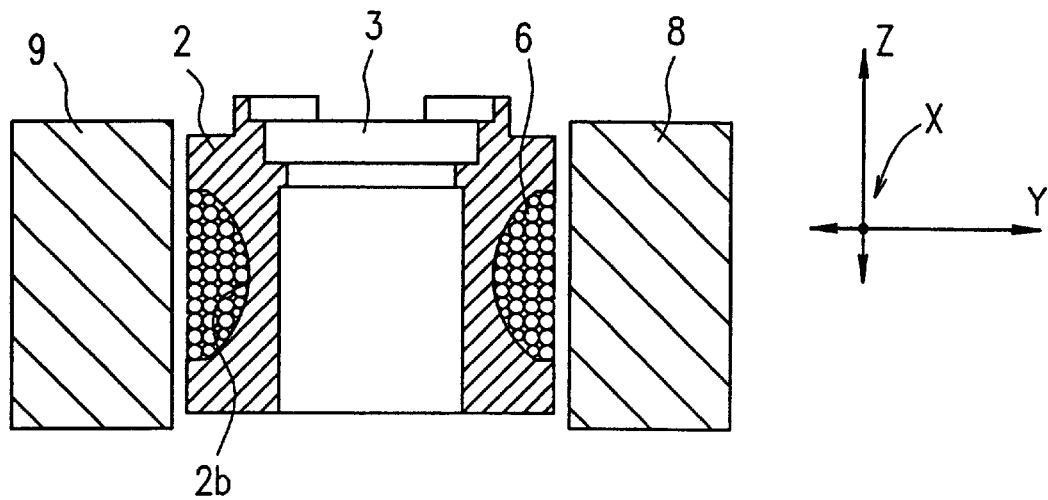
FIG. 8A is a cross-sectional view of another alternative structure of the lens holder and the focusing coil usable in the objective lens driving apparatus shown in FIG. 1.
Figure 8B:
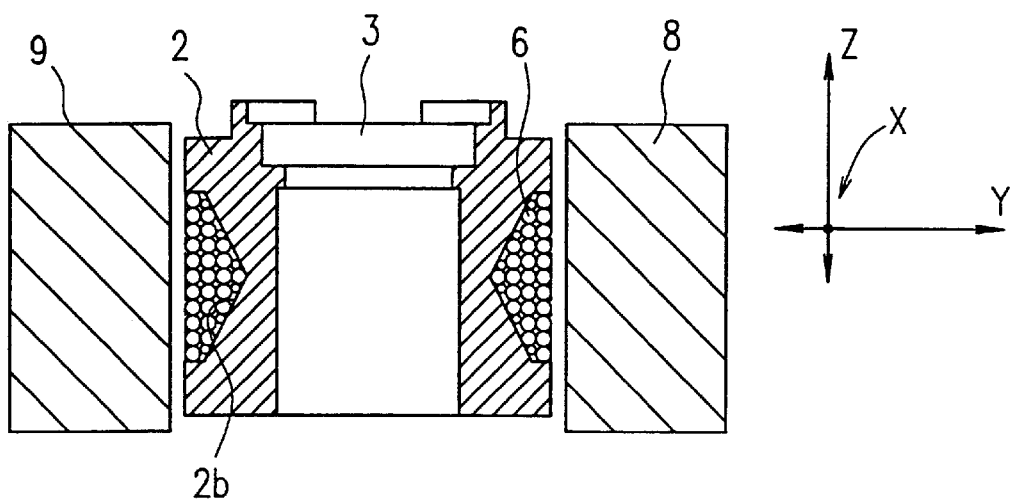
FIG. 8B is a cross-sectional view of still another alternative structure of the lens holder and the focusing coil usable in the objective lens driving apparatus shown in FIG. 1.
Figure 9:
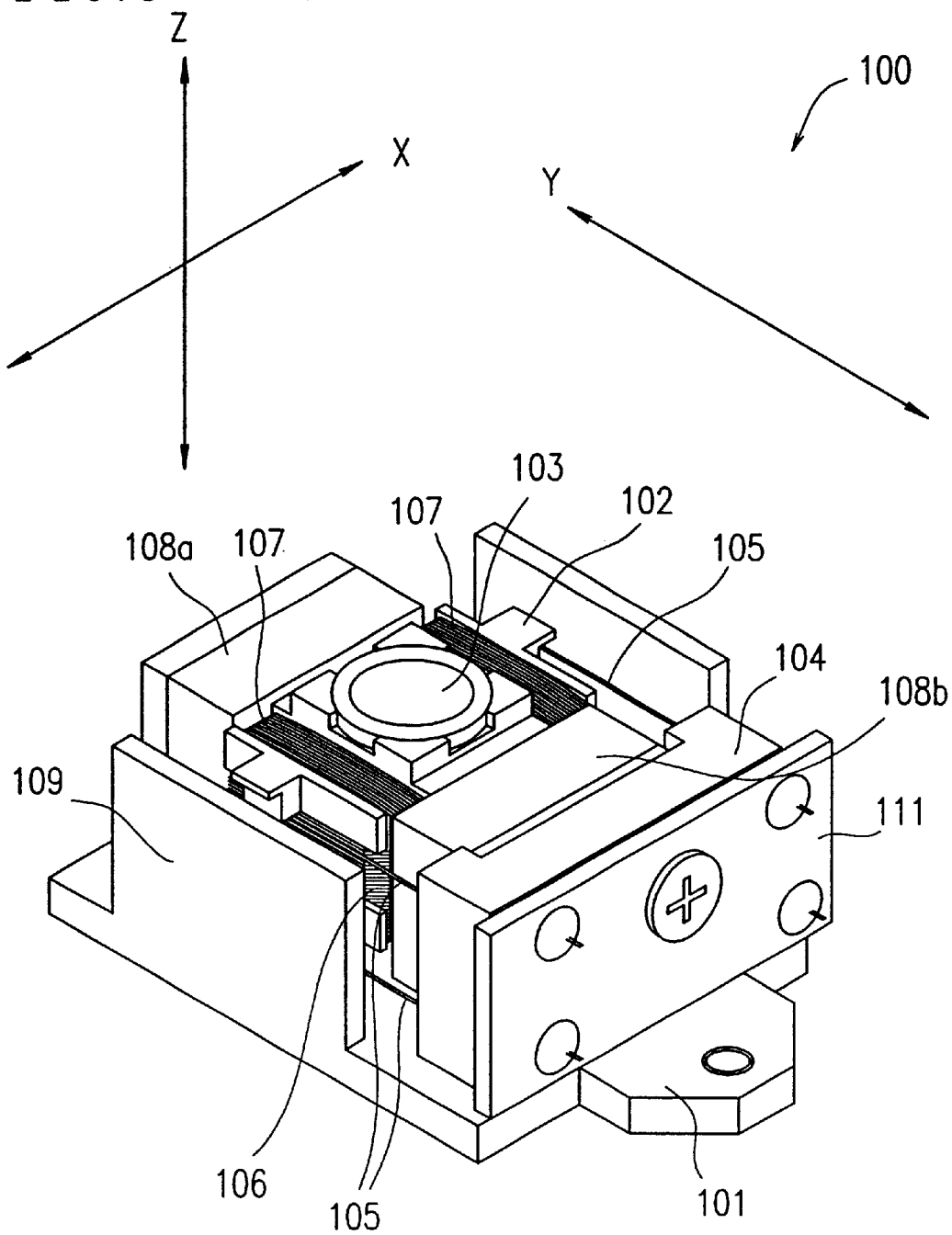
FIG. 9 is an isometric view of a conventional objective lens driving apparatus.

FIGS. 8A and 8B are cross-sectional views of still another alternative structures of the lens holder 2 and the focusing coil 6. As shown in FIGS. 8A and 8B, the side walls of the lens holder 2 to be provided with the focusing coil 6 can have a recessed portion 2b. Due to such a structure, the focusing coil 6 is concentrated in an area having a high magnetic flux density of the magnet. As a result, the force for moving the lens holder 2 is efficiently generated: the sensitivity of the lens holder 2 to the acceleration is enhanced: and a higher operating speed and lower power consumption of the optical disk recording and reproduction apparatus are realized.

Similar effects are obtained also by forming a plurality of grooves in side surfaces of the lens holder 2 to be provided with the tracking coil or by forming a recessed portion in such side surfaces.

The present invention is not limited to the above-described examples and various modification can be made. For example, the lens holder is supported by the four elastic supporting members in the above-described example. Alternatively, the lens holder can be movably supported by extending a plurality of parallel leaf springs between the lens holder and the securing base, or by any other appropriate mechanism. In order to generate the magnetic fluxes crossing the focusing coil to be substantially linearly, shapes and positions, magnitude of the magnetic fluxes, and magnetization direction of the magnets can be appropriately combined.

According to the present invention, a magnetic generation section generates magnetic fluxes crossing the focusing perpendicular to the vertical direction. The magnetic fluxes are substantially linear. Therefore, even when the focusing coil is moved in the tracking direction (perpendicular to the vertical direction), the angle of the magnetic fluxes with respect to the focusing coil does not change. In the state where an electric current flows in the focusing coil, the magnitude of the force acting on the focusing coil does not change, regardless of the position of the focusing coil in the tracking direction. Thus, the tilt of the objective lens caused by the movement thereof in the tracking direction is avoided. As a result, generation of an optical aberration at a spot on the recording layer of the optical disk to which light is converged by the objective lens is prevented. Therefore, a focal shift with respect to the recording layer is avoided, and signals is recorded to the recording layer accurately. Consequently, the signals are reproduced accurately from the recording layer.

The magnitude of an unnecessary force generated by the focusing coil is reduced by causing the linear magnetic fluxes to cross the focusing coil obliquely.

The size of the holder is reduced. Accordingly, the frequency response characteristics of the objective lens are enhanced; the sensitivity of the holder to the acceleration which is required to comply with the fluctuation of the recording layer or decentration of the optical disk; and a high operating speed or lower power consumption of the optical disk are realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An objective lens driving apparatus, comprising:
   an objective lens opposed to an optical disk, the objective lens having an optical axis in a vertical direction which is perpendicular to the optical disk;
   a holder for holding the objective lens;
   a supporting member for supporting the holder to be movable in at least the vertical direction and a radial direction of the optical disk;
   a focusing coil provided on the holder and wound around the vertical direction; and
   a magnetic field generation section for generating a magnetic flux crossing the focusing coil in a direction perpendicular to the vertical direction, the magnetic flux being generated to be substantially linear.

2. An objective lens driving apparatus according to claim 1, wherein the magnetic field generation section includes a pair of magnets arranged in a tangent direction of the optical disk and opposed to each other, the focusing coil is disposed between the magnets, and the magnets have magnetic fields of different magnitudes so as to generate the substantially linear magnetic flux crossing the focusing coil.

3. An objective lens driving apparatus according to claim 2, wherein the magnets have different lengths in the radial direction of the optical disk so as to have magnetic fields of different magnitudes.

4. An objective lens driving apparatus according to claim 2, further comprising a magnetic material having a first wall for covering an outer side surface of one of the magnets, and a second wall and a third wall for electromagnetically shielding a space between the magnets.

5. An objective lens driving apparatus according to claim 4, wherein the magnetic material positions one of the magnets and electromagnetically shields the space between the magnets.

6. An objective lens driving apparatus according to claim 2, wherein the magnets have different thicknesses in the tangent direction of the optical disk so as to have magnetic fields of different magnitudes.

7. An objective lens driving apparatus according to claim 2, wherein the magnets are formed of materials having different magnetic characteristics.

8. An objective lens driving apparatus according to claim 1, wherein the focusing coil has an asymmetric shape with respect to an axis in the radial direction of the optical disk, the axis in the radial direction running through a substantially central point of the focusing coil.

9. An objective lens driving apparatus according to claim 1, further comprising a tracking coil provided on the holder and wound around the radial direction of the optical disk, wherein the tracking coil has an asymmetric shape with respect to an axis in the vertical direction of the optical disk, the axis in the vertical direction running through a substantially central point of the tracking coil.

* * * * *